US012762082B2

(12) United States Patent
Heinrich et al.

(10) Patent No.: US 12,762,082 B2
(45) Date of Patent: Oct. 13, 2026

(54) SERIAL PERIPHERAL INTERFACE COMMUNICATION SYSTEM AND METHOD

(71) Applicant: Aptiv Technologies AG, Schaffhausen (CH)

(72) Inventors: Markus Heinrich, Wiehl (DE); Cyril Roumier, Angoulins (FR)

(73) Assignee: Aptiv Technologies AG, Schaffhausen (CH)

( * ) Notice: Subject to any disclaimer, the term of this patent is extended or adjusted under 35 U.S.C. 154(b) by 24 days.

(21) Appl. No.: 18/894,397

(22) Filed: Sep. 24, 2024

(65) Prior Publication Data

US 2025/0110914 A1 Apr. 3, 2025

(30) Foreign Application Priority Data

Sep. 29, 2023 (EP) .................................... 23200950

(51) Int. Cl.
*G06F 13/42* (2006.01)

(52) U.S. Cl.
CPC .. *G06F 13/4282* (2013.01); *G06F 2213/0002* (2013.01)

(58) Field of Classification Search
CPC .................................................. G06F 18/2178
See application file for complete search history.

(56) References Cited

U.S. PATENT DOCUMENTS

| | | | | |
|---|---|---|---|---|
| 5,566,353 | A * | 10/1996 | Cho | H04N 7/17336 725/138 |
| 8,151,134 | B2 * | 4/2012 | Huang | G06F 13/4282 710/60 |
| 2008/0126638 | A1 | 5/2008 | Lee | |
| 2021/0280222 | A1 | 9/2021 | Chang | |
| 2022/0327092 | A1 | 10/2022 | Barrenscheen | |

OTHER PUBLICATIONS

Modbus Application Protocol Specification V1.1b3 (Year: 2012).*
Extended European Search Report for EP App 23/200,950 filed Sep. 29, 2023, dated Mar. 21, 2024, 8 pages.

* cited by examiner

*Primary Examiner* — Henry Tsai
*Assistant Examiner* — Juanito C Borromeo
(74) *Attorney, Agent, or Firm* — Miller Johnson

(57) ABSTRACT

A method of serial peripheral interface (SPI) communication includes transmitting a data packet from a master device to a slave device. The data packet includes a read register address, a write register address, and write data. The read register address and the write register address correspond to a data register of a plurality of data registers of the slave device. The method includes receiving a portion of the data packet at the slave device. The portion of the data packet includes the read register address. The method includes reading the read register address in the data packet at the slave device. The method includes transmitting, from the slave device, data from the data register corresponding to the read register address of the slave device to the master device after the read register address has been read.

13 Claims, 2 Drawing Sheets

SERIAL PERIPHERAL INTERFACE COMMUNICATION SYSTEM AND METHOD

CROSS-REFERENCE TO RELATED APPLICATIONS

This application claims priority to EP 23 200 950 filed Sep. 29, 2023, the entire disclosure of which is incorporated by reference.

FIELD

The present disclosure relates to a method and system for serial data communication between a master device and one or more slave devices.

BACKGROUND

A serial peripheral interface (SPI) is a communication interface typically used for data communication between a master device (e.g., a computer and a microcontroller) and slave devices such as peripheral slave chips used in conjunction with peripheral devices (e.g., peripheral integrated circuits (ICs)) such as shift registers, sensors, analogue-to-digital converters (ADCs), digital-to-analogue converters (DACs) and memory devices.

A conventional SPI interface uses 4-wires, where each wire transmits the following signals: serial clock (or clock signal); main out, subnode in (MOSI) for transmitting data from the main (i.e., master or controller device) to the subnode (i.e., a slave or peripheral device); main in, subnode out (MISO) for transmitting data from the subnode to the main; and a chip select line for selecting which peripheral to communicate with.

To begin SPI communication, the master device establishes communication with the slave device using the chip select line. Once the communication has been established with the slave device, the master device transmits to the slaves a start register address (i.e., an address byte) that indicates from which slave register address the slave will start reading data for a read operation by the master, or from which slave register address the master will start writing data to the slave.

Typically, the master device requests new data (or information) from the slave device, or write data to the slave device, on demand. To read data from the slave device, the master device sends the read-address to the slave of the register it would like to read the data content from. To write data to the slave device, the master device sends the write address to the slave of the register it would like to write the data content to. Finally, the slave sends back to the master device the data content which was requested, or confirmation that the data has been written to the slave. However, both the read and write requests are separate communications. Therefore, the master device needs to communicate twice (i.e., two communication cycles) with the slave device before both a read and write operation are performed.

Accordingly, there may be a need for an improved SPI communication interface that makes more efficient use of SPI communication.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present disclosure seeks to address the problems associated with conventional SPI communication, particularly reducing the number of communications between a master and a slave device.

According to a first aspect, a method of peripheral interface, SPI, communication is disclosed according to claim 1. Particularly, the method comprises the step of transmitting a data packet from the master device to a slave device. Alternatively, the master devices can be referred to as a controller and slave device can be referred to as peripheral device. The data packet comprising a read register address, a write register address, and write data. The read register address and the write register address corresponding to a data register of the plurality of data registers of the slave device. The method further comprises the step of receiving a portion of the data packet at the slave device. The portion of the data packet comprising the read register address. The method further comprises the step of reading the read register address in the data packet at the slave device. The method further comprises the step of transmitting, from the slave device, data from the data register corresponding to the read register address of the slave device to the master device after the read register address has been read. In one form, transmitting, from the slave device, data from the data register corresponding to the read register address of the slave device to the master device once the read register address has been read and before the master device finishes the transmitting the data packet.

In this way, a master device can transmit both a read operation and a write operation in the same communication to a slave device. As such, the number of data packets sent between the master device and slave device is minimized, which results in faster and more efficient communication between the master device and the slave device. The slave device sends the data to the master device before the master device transmits the whole data packet, which results in faster read operations. In addition, the slave device does not need to store information between subsequent communications as both the read and write operations are transmitting in one data packet.

In one form, the method further comprises transmitting the read register address of the slave device to the master device. In this way, the master device is able to determine if the correct register was read at the slave device.

In one form, the method further comprises reading the write register address at the slave device. The write register address corresponding to the data register of the plurality of data registers of the slave device for storing the write data. The method further comprising the step of storing the write data at the write register address of the slave device. In this way, write data (or any data to be written to the slave device) can be transmitted and then subsequently stored at the corresponding register of the slave device.

In one form, a delay is provided between reading, at the slave device, the read register address of the slave device and transmitting, from the slave device, the data from the read register address of the slave device. In this way, the slave device transmits the data the master device needed in addition to the data being written to a register of the slave device.

In one form, the delay corresponds with a length of the write register address transmitted by the master device. In this way, the length of the data packet transmitted from the slave device corresponds with the length of the data packet sent to the slave device. In addition, the delay provides sufficient time for the slave device to find, prepare and transmit the data to the master device.

In one form, the data packet comprises parity data. In this way, every portion of the data packet can be verified to be correct.

In one form, the read register address of the slave device transmitted to the master device comprises a read address parity check. In this way, the master device can verify if the correct read address has been received at the slave device and the data transmitted to the master device is the data requested.

In one form, the method further comprises transmitting check data from the slave device to the master device. In this way, the slave device can verify that both the read and write operations have been successfully completed.

In one form, transmitting the data from the slave device to the master device and transmitting the write data from the master device to the slave device occurs at the same time. In this way, information between the slave and master device can be transmitted at the same time providing more efficient communication and does not require additional communication cycles to transmit information between the master and slave devices.

In a second aspect, a serial peripheral interface, SPI, communication system is disclosed according to claim 10. The system comprising a master device and a slave device. The master device is configured to transmit a data packet to the slave device. The data packet comprising a read register address, a write register address, and write data. The read register address and the write register address correspond to a data register of the plurality of data registers of the slave device. The slave device is configured to receive and read a portion of the data packet comprising the read register address, and transmit data from the read register address of the slave device to the master device after the read register address has been read.

In one form, the slave device is configured to transmit the read register address of the slave device to the master device.

In one form, the slave device is configured to read the write register address, the write register address comprising a register location for the write data to be stored, and stores the write data at the write register address of the slave device.

In one form, the slave device is configured to provide a delay between reading, at the slave device, the read register address of the slave device and transmitting, from the slave device, the data from the read register address of the slave device.

In one form, the delay corresponds with a length of the write register address transmitted by the master device.

In one form, the slave device is configured to transmit the data to the master device at the same time as the master device transmits the write data to the slave device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The Aspects of implementation will be described with reference to the accompanying drawings in which.

In the drawings, reference numbers may be reused to identify similar and/or identical elements.

DETAILED DESCRIPTION

The following description presents exemplary embodiments and, together with the drawings, serves to explain principles of the disclosure. However, the scope of the invention is not intended to be limited to the precise details of the embodiments or exact adherence with all system features and/or method steps, since variations will be apparent to a skilled person and are deemed also to be covered by the description. Terms for components used herein should be given a broad interpretation that also encompasses equivalent functions and features.

In some cases, several alternative terms (synonyms) for structural, system or method features have been provided but such terms are not intended to be exhaustive. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

It will be understood that the illustrated embodiments show applications only for the purposes of explanation. In practice, the invention may be applied to many different configurations, where the embodiment is straightforward for those skilled in the art to implement.

Figure 1:
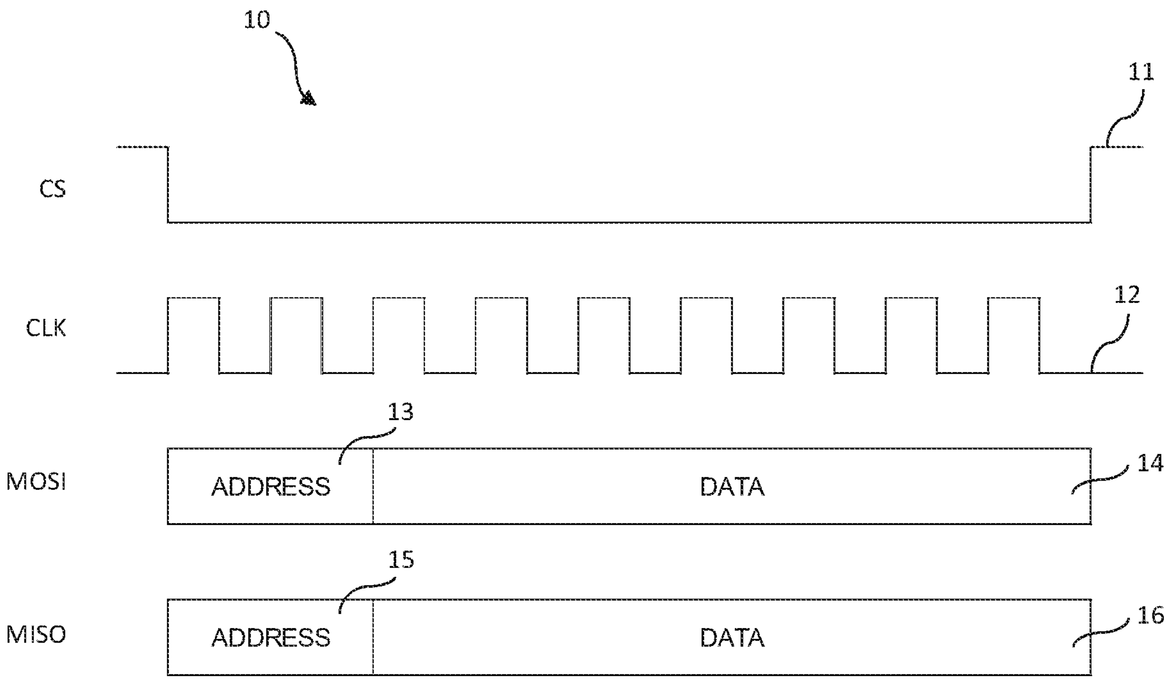
FIG. 1 PRIOR ART
FIG. 1 illustrates a SPI communication according to the prior art.

By way of background, FIG. 1 illustrates SPI communication 10 between a master device and a slave device (not shown). The SPI communication 10 occurs through four signal lines: a chip select (CS) line, a clock signal (CLK) line, a MOSI data line, and a MISO data line. In the illustrated example, the CS signal 11 is held at a high state on the CS line when serial data communication is not intended between the master device and the slave device. If the master device needs to communicate with a slave device, the CS signal 11 to said slave device is held at a low state during the serial data communication between the master device and the slave device. Alternatively, the high and low state can be reversed. Whilst not shown, it is known in the art that multiple slave devices can be connected to a master device, whereby the CS line is used to activate at least one of the slave devices that are connected to the master device such that serial data communication can occur between the master device and the selected slave device(s). According to FIG. 1, once the write or read operation has been completed successfully, the master device deactivates the CLK signal 12 and sets the CS signal 11 to a high state.

In SPI communication, the clock signal 12 is a periodic signal that synchronizes the data transfer between the master and slave devices and is typically transmitted by the master device. The clock signal 12 determines the maximum data transfer rate and the bit timing of the data transfer. Importantly, the slave device uses the clock signal 12 to determine when to receive data. The clock signal can first be transmitted in the high state or in the low state depending on the configuration of the master and slave device.

Once, as shown in the FIG. 1 example, the CS signal 11 is held at a low state and the master device transmits a clock signal 12 on the CLK line, SPI communication between the master device and slave device can occur. The master device transmits a data packet on the MOSI line to the slave device. Importantly, the data packet comprises either a read or write address 13. In addition, the data packet comprises data 14, which comprises information to be written to the slave device at the write address 13, or the data comprises a read command 14 if the master devices need to read data from the read address of the slave device. The data packet is received at the slave device, which receives and reads the data packet according to the CLK signal 11.

The slave device comprises a plurality of registers, each with a corresponding register address. Each register corresponds with a parameter stored by the slave device. For example, one such parameter can be a temperature reading that is stored at a register of the slave device. If the master device needs to read data from a register of the slave device, the master device sends the read register address 13 of the register it needs to read data from. The data 14 comprises a read command, which indicates to the slave device that the master needs to read data from the slave device. Once the slave device receives the data packet, the slave device copies the data from the register, corresponding with the transmitted read address, to an SPI transmit register before being transmitted to the master device. Once this has occurred, the slave device transmits a data packet back to the master device via the MISO line. The data packet comprising the read address 15 of the register from which the data was read and the data 16 from the SPI transmit register. The data packet is received at the master device, which receives and reads the data packet according to the CLK signal 11.

Alternatively, if the master devices needs to write data to a register of the slave device, the master device sends a write address 13 and write data 14 in the data packet on the MOSI line to the slave device. The write address 13 corresponding with the register of the slave device that data is to be written to. The data packet is received at the slave device, which receives and reads the data packet according to the CLK signal 11. The slave device stores the write data 14 at the register corresponding to the write address 13. In return, the slave transmits a data packet back to the master device on the MISO line. The data packet comprising the write address 15 of the register of the slave device where the write data 14 was written to, and data 16 comprising a status code indicating if the operation was successful or unsuccessful.

Accordingly, due to limitations of the SPI communication method of FIG. 1, the master device must send two data packets (i.e., two separate messages) to transmit a read command and a write command. As such, the read command and the write command occurs over two communication cycles which results in a delay in communication as the master device needs to send two messages before both commands (or operations) are completed.

Figure 2:
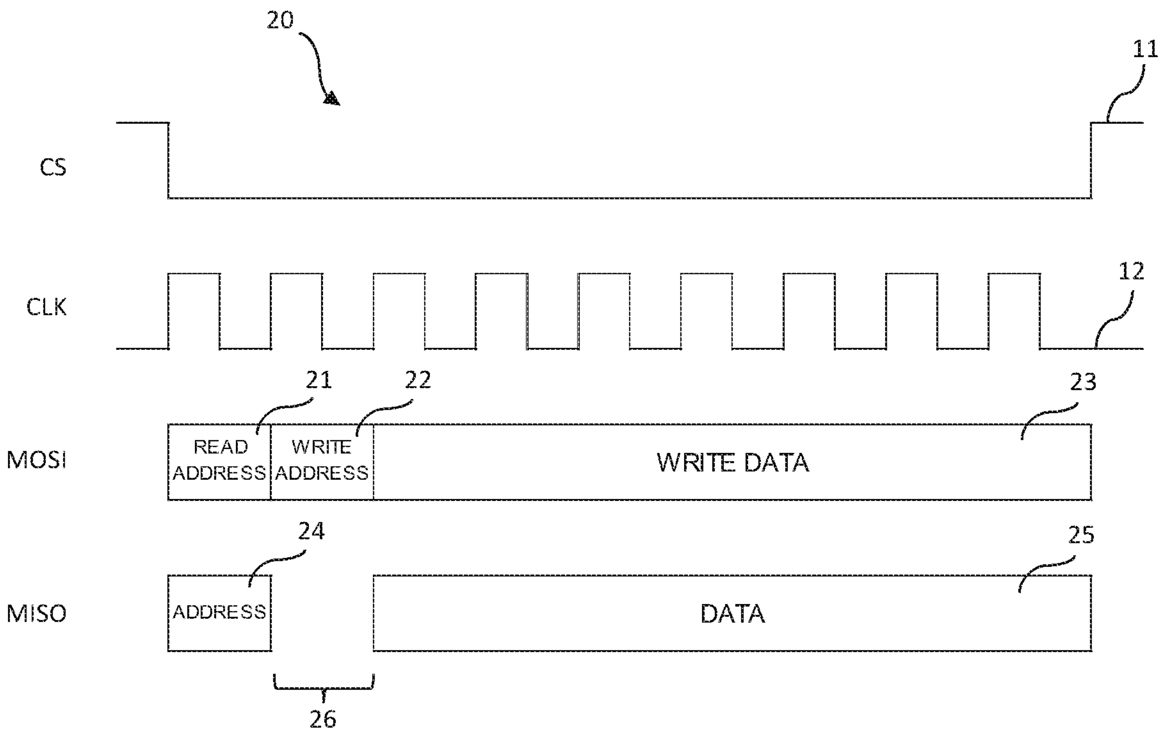
FIG. 2 illustrates an SPI communication according to the present invention.

FIG. 2 shows SPI communication 20 between a master device and a slave device, according to the present disclosure, wherein a read and write command may be transmitted in one data packet (i.e., in one communication cycle). To achieve this, the master device transmits a data packet on the MOSI line to the slave device. The data packet comprising a read address 21, a write address 22 and write data 23. The read address 21 corresponding with a register of the slave device from which the master device needs to read from. The write address 22 corresponding with a register of the slave device from which the master device needs to write data to. The write data 23 comprising data to be written to the write address 22 corresponding with a data register of the slave device.

The slave device receives the data packet and reads the information from the data packet. Once the slave device reads the read address 21 in the data packet from the master device, the slave device transmits a data packet to the master device with the read address 24 of the register from which the data 25 was read from and the data 25 contained at that particular read address 24 of the slave device. The transmission of the data packet to the master device is defined by the SPI clock.

A delay 26 (corresponding to a time delay in CLK signal cycles) between the transmission of the read address 24 and the data 25 can be implemented, such that the slave device has sufficient time to receive and read the read address 21 and to prepare the data 25 at the read address 21 for transmission to the master device in the data packet. For example, the delay 26 (or waiting time), could be according to cycles of CLK signal 12, or the delay 26 could correspond with the time taken (e.g., in cycles of CLK signal 12) for the master device to transmit the write address 22. In one example, the slave device does not transmit the data 25 to the master device within the delay 26. During the delay 26, the slave device prepares the data by copying the relevant data to the slave device SPI data transmission register within the delay 26. Subsequently, the slave device sends the data 25 to the master device synchronously with the SPI clock (i.e., in the timeframe the master device sends the write data 23 to the slave device). Accordingly, the slave device transmits the data 25 to the master device once the read address 24 has been read and before the master device finishes sending the communication (i.e., the data packet).

Additionally, each of the read address 21, the write address 22, and the write data 23 can comprise parity data. The parity data comprising a parity bit, or a control bit, to ensure that the read address 21, the write address 22, and/or the write data 23 have not been corrupted during the communication process. Likewise, each of the read address 24 and the data 25 can also include a parity bit or a control bit. Optionally, the parity data can comprise a checksum. The checksum comprising one or more bits to verify data integrity.

Moreover, the slave device could send a confirmation bit (or an OK bit) at the end of the data packet. The confirmation bit can be transmitted by the slave device once the parity bit checks are successful and it has been verified that the correct data packet was transmitted to the master device. The confirmation bit provides confirmation to the master device that the communication was successful. If the confirmation bit is not sent by the slave device, the master device may resend the data packet as it may be assumed the previous communication was unsuccessful.

Figure 3:
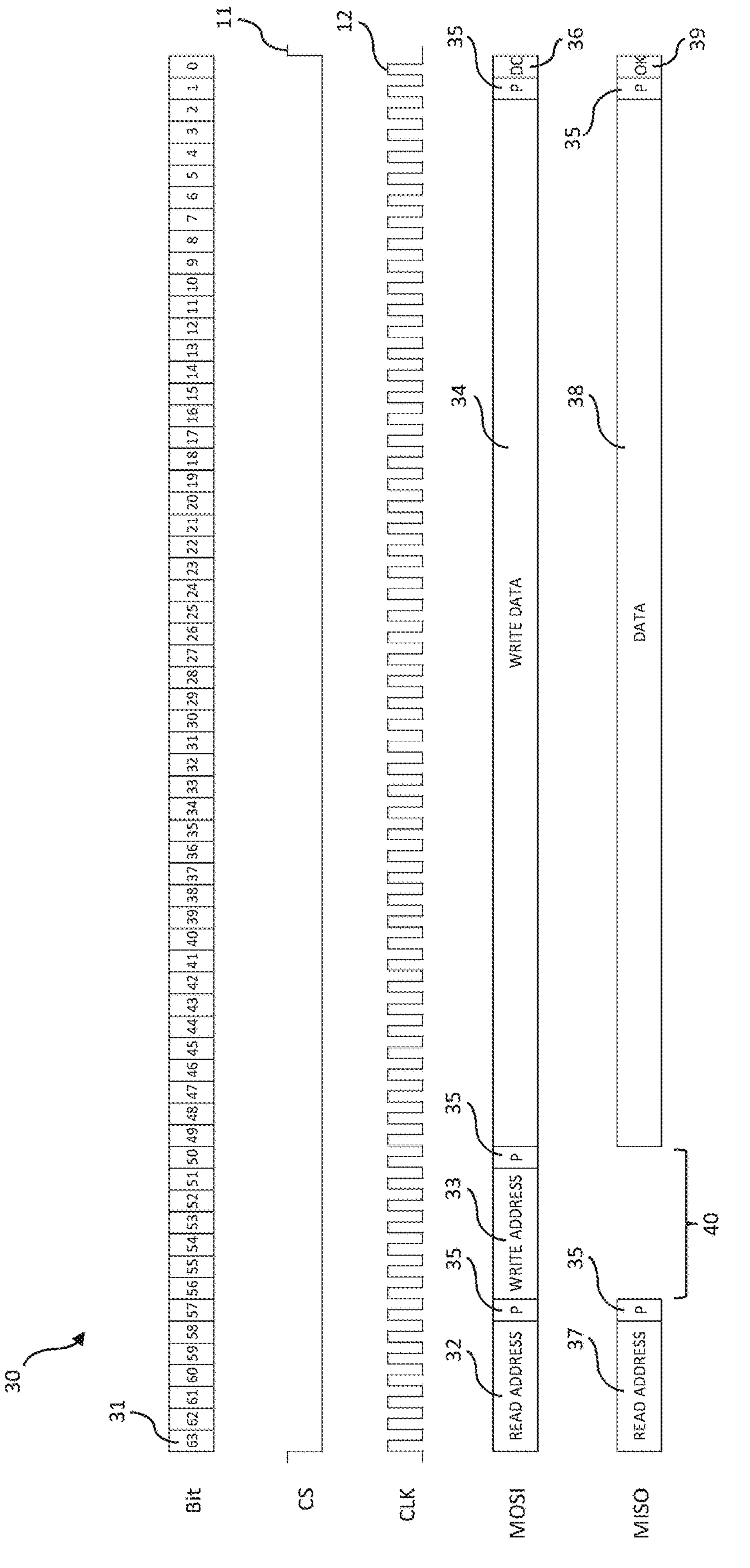
FIG. 3 illustrates a 64-bit SPI communication according to the present invention.

FIG. 3 shows an exemplary 64-bit SPI communication 30 between a master device and a slave device. Whilst FIG. 3 shows 64-bit SPI communication 30, it is understood that SPI communication according to the present invention can occur using any of 8-bit, 16-bit and 32-bit SPI communication.

Typically, the most significant bit 31 of the data packet is transmitted first to the slave device. Alternatively, the least significant bit of the data packet is transmitted first to the slave device. As such, the read address 32 is the first portion of the data packet to be transmitted to the slave device, followed by a parity (P) bit 35 to ensure that the read address was transmitted and received correctly. Afterwards, the write address 33 and a corresponding parity bit 35 are transmitted to the slave device. Subsequently, the write data 34 and a parity bit 35 is sent to the slave device. Whilst a parity bit 35 has been described, it is possible for the parity bit 35 to be replaced or used in combination with a parity check. The parity check comprising at least one bit for verifying data integrity. For example, the parity check can be a checksum. A DC bit 36, or data command bit 36, may be transmitted in the data packet to indicate the polarity of the data clock. In addition, when the DC bit 36 is high, the data on the MOSI line is interpreted as a command. When the DC bit 36 is low, the data on the MOSI line is interpreted as data. The DC bit 36 can be transmitted first or last in the communication depending on the configuration of the master and slave device.

In response to the data packet transmitted by the master device, the slave device transmits back the read address 37 to the master device on the MISO line. The read address 37 comprises a parity bit 35 to verify that the read address 37 was transmitted correctly. After the read address 37 is transmitted, a delay 40 is initiated that corresponds with the length of time (e.g., in cycles of the CLK signal 12) it takes for the master device to transmit the write address 33 and the corresponding parity bit 35. Once write address 33 and the parity bit 35 have been transmitted to the slave device, the slave device transmits the data 38 from the read address 37 of the register of the slave device. In addition, the data 35 comprises a parity bit 35 and a confirmation bit 39.

By this approach, the master device needs to communicate only once with the slave device to write data to a register of the slave device and directly receive new information from the read address of the slave device. In addition, the master device receives confirmation by way of the confirmation bit 39 that both the read and write operation was successful.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method of serial peripheral interface (SPI) communication, the method comprising:

transmitting a data packet from a master device to a slave device, wherein:

the data packet includes a read register address, a write register address, and write data, and the read register address and the write register address correspond to a data register of a plurality of data registers of the slave device;

receiving a portion of the data packet at the slave device, wherein the portion of the data packet includes the read register address;

reading the read register address in the data packet at the slave device; and transmitting, from the slave device, data from the data register corresponding to the read register address of the slave device to the master device after the read register address has been read, wherein transmitting the data from the slave device to the master device and transmitting the write data from the master device to the slave device occur simultaneously.

2. The method of claim 1 further comprising transmitting the read register address of the slave device to the master device.

3. The method of claim 1 further comprising:

reading the write register address at the slave device, wherein the write register address corresponds to the data register of the plurality of data registers of the slave device for storing the write data; and storing the write data at the write register address of the slave device.

4. The method of claim 1 wherein a delay is provided between reading, at the slave device, the read register address of the slave device and transmitting, from the slave device, the data from the read register address of the slave device.

5. The method of claim 4 wherein the delay corresponds with a length of the write register address transmitted by the master device.

6. The method of claim 1 wherein the data packet includes parity data.

7. The method of claim 2 wherein the read register address of the slave device transmitted to the master device includes a read address parity check.

8. The method of claim 1 further comprising transmitting check data from the slave device to the master device.

9. A serial peripheral interface (SPI) communication system comprising:

a master device; and a slave device, wherein:

the master device is configured to transmit a data packet to the slave device, the data packet includes a read register address, a write register address, and write data, the read register address and the write register address correspond to a data register of a plurality of data registers of the slave device, the slave device is configured to (i) receive and read a portion of the data packet including the read register address and (ii) transmit data from the read register address of the slave device to the master device after the read register address has been read, and the slave device transmits the data to the master device and the master device transmits the write data to the slave device simultaneously.

10. The SPI communication system of claim 9 wherein the slave device is configured to transmit the read register address of the slave device to the master device.

11. The SPI communication system of claim 9 wherein:

the slave device is configured to read the write register address, the write register address includes a register location for the write data to be stored, and the slave device is configured to store the write data at the write register address of the slave device.

12. The SPI communication system of claim 9 wherein the slave device is configured to provide a delay between reading, at the slave device, the read register address of the slave device and transmitting, from the slave device, the data from the read register address of the slave device.

13. The SPI communication system of claim 12 wherein the delay corresponds with a length of the write register address transmitted by the master device.

* * * * *